United States Patent
Jiang et al.

(10) Patent No.: US 10,053,601 B2
(45) Date of Patent: Aug. 21, 2018

(54) GLYOXAL ADHESIVE SYSTEM AND PROCESS FOR MANUFACTURING THE SAME

(71) Applicant: ESSILOR INTERNATIONAL (COMPAGNIE GENERALE D'OPTIQUE), Charenton-le-Pont (FR)

(72) Inventors: Peiqi Jiang, Plano, TX (US); Ronald A. Berzon, Dallas, TX (US); Steven Weber, Carrollton, TX (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 691 days.

(21) Appl. No.: 14/418,666

(22) PCT Filed: Aug. 1, 2013

(86) PCT No.: PCT/EP2013/066211
§ 371 (c)(1),
(2) Date: Jan. 30, 2015

(87) PCT Pub. No.: WO2014/020118
PCT Pub. Date: Feb. 6, 2014

(65) Prior Publication Data
US 2015/0225616 A1    Aug. 13, 2015

Related U.S. Application Data

(63) Continuation of application No. 13/564,008, filed on Aug. 1, 2012, now Pat. No. 9,315,693.

(51) Int. Cl.
*C09J 11/06* (2006.01)
*B29D 11/00* (2006.01)
(Continued)

(52) U.S. Cl.
CPC ............ *C09J 11/06* (2013.01); *B29D 11/0073* (2013.01); *B32B 23/08* (2013.01); *B32B 27/306* (2013.01);
(Continued)

(58) Field of Classification Search
CPC ........ C09J 11/06; C09J 129/04; C09J 101/10; C09J 101/28; B29D 11/0073;
(Continued)

(56) References Cited

U.S. PATENT DOCUMENTS 4,327,402 A    4/1982   Aubrey
4,902,464 A    2/1990   Cartier et al.
(Continued)

OTHER PUBLICATIONS

"Glyoxal—Simple bi-functional molecule for multiple requirements", BU Detergents & Intermediates, Mar. 1, 2011 (Mar. 1, 2011) , pp. 1-8, XP55076074, Retrieved from the Internet: URL:http://www.clariant.com/CI2575E4001FB2B8/ vwLookupDownloads/ DetergentsIntermediates_Newsroom_Brochures_Glyoxal.pdf/ $FILE/De tergentsIntermediates_Newsroom_Brochures_Glyoxal. pdf [retrieved on Aug. 22, 2013] "Characteristics"; p. 2, right-hand column.
(Continued)

*Primary Examiner* — Ruiyun Zhang
(74) *Attorney, Agent, or Firm* — Young & Thompson

(57) ABSTRACT

An optical adhesive product and a process for manufacturing an optical adhesive product, laminated film ensembles, and laminated lenses. The optical adhesive product includes a glyoxal water solution that is pH adjusted for use as an optical adhesive that demonstrates a wet peel force strength above about 6 Newtons. A water based polymer, such as PVOH, may be added to the adhesive system. According to the process, the glyoxal adhesive system is manufactured and utilized to laminate TAC-PVA-TAC films together to (Continued)

form a polar film ensemble. The polar film ensemble is laminated to an optical substrate and in the case of an ophthalmic lens, surfaced, coated and edged. The optical adhesive product avoids film separation in the polar TAC-PAV-TAC film ensemble during edging.

10 Claims, 2 Drawing Sheets

(51) Int. Cl.
  *B32B 27/30* (2006.01)
  *C09J 129/04* (2006.01)
  *G02C 7/12* (2006.01)
  *B32B 23/08* (2006.01)
  *B32B 37/06* (2006.01)
  *B32B 37/10* (2006.01)
  *B32B 37/12* (2006.01)
  *B32B 37/18* (2006.01)
  *B32B 37/24* (2006.01)
  *C09J 101/10* (2006.01)
  *C09J 101/28* (2006.01)
  *C09J 105/00* (2006.01)
  *C09J 175/04* (2006.01)

(52) U.S. Cl.
  CPC .......... *B32B 37/06* (2013.01); *B32B 37/1027* (2013.01); *B32B 37/1284* (2013.01); *B32B 37/182* (2013.01); *B32B 37/24* (2013.01); *C09J 101/10* (2013.01); *C09J 101/28* (2013.01); *C09J 105/00* (2013.01); *C09J 129/04* (2013.01); *C09J 175/04* (2013.01); *G02C 7/12* (2013.01); *B32B 2037/1246* (2013.01); *B32B 2037/243* (2013.01); *B32B 2250/03* (2013.01); *B32B 2307/40* (2013.01); *B32B 2307/412* (2013.01); *B32B 2307/70* (2013.01); *B32B 2317/18* (2013.01); *B32B 2329/04* (2013.01); *B32B 2551/00* (2013.01); *G02C 2202/16* (2013.01)

(58) Field of Classification Search
  CPC ... B32B 27/306; B32B 37/06; B32B 37/1284; B32B 37/24; B32B 2037/1246; B32B 2037/1276; B32B 2250/03; B32B 2307/412; B32B 2329/04; B32B 2251/00; G02C 2202/16
  USPC ........... 428/1.1, 1.3, 1.5; 156/182, 325, 326; 524/354
  See application file for complete search history.

(56) References Cited

U.S. PATENT DOCUMENTS

| | | |
|---|---|---|
| 5,114,999 A | 5/1992 | Hui et al. |
| 5,496,649 A | 3/1996 | Mallory et al. |
| 2006/0155061 A1 | 7/2006 | Liao et al. |
| 2006/0252855 A1 | 11/2006 | Pisanova et al. |
| 2007/0134445 A1 | 6/2007 | Tsai |
| 2007/0167561 A1 | 7/2007 | Pisanova et al. |
| 2008/0278810 A1 | 11/2008 | Kim et al. |
| 2012/0236255 A1* | 9/2012 | Jiang .................. B29D 11/0073 351/159.42 |

OTHER PUBLICATIONS

"Glyoxal—The Sustainable Solution for Your Business", Jan. 6, 2009 (Jan. 6, 2009), pp. 1-8, XP55076086, Retrieved from the Internet: URL:http://worldaccount.basf.com/wa/NAFTA/Catalog/ChemicalsNAFTA/doc4/BASF/PRD/30037091/.pdf?title=Brochure&asset type=pi/pdf&language=EN &urn=urn:documentum:eCommerce 01EU:09007bb2800475c8.pdf—[retrieved on Aug. 22, 2013] Y "Properties of a Solution"; p. 5.

International Search Report, dated Sep. 3, 2013, from corresponding PCT application.

* cited by examiner

GLYOXAL ADHESIVE SYSTEM AND PROCESS FOR MANUFACTURING THE SAME

BACKGROUND OF THE INVENTION

1. Field of the Invention

The present invention relates to a polarized optical article which maintains its integrity after typical processing of an optical article which includes edging. Delamination of the polarizing wafer can be prevented by using a glyoxal adhesive system and process for manufacturing same.

2. The Prior Art

According to the prior art, glyoxal is widely used as a film additive, for example to improve the properties of polyvinyl alcohol (PVA) films. In the Polymer Journal, Vol 25, No. 12, pp 1295-1302 (1993) article entitled *Effects of the Degree of Cross Linking on Properties of PVA Membranes*, the authors propose using glyoxal and glutaraldehyde as film additives. In the Korean J. of Chem. Eng, 11(1), 41-47 (1994) the article states that "to increase the stability of PVA membrane to water, it should be cross linked with an aldehyde". The article proposes to use glutaraldehyde as the aldehyde of choice. Similarly, U.S. Pat. No. 4,357,402 describes preparing a film and cross-linking with a dialdehyde such as glyoxal or polyaldehydepolysaccharide compounds.

U.S. Pat. No. 5,114,999 discloses using glyoxal as a binder insolubilizer in a paper coating composition. U.S. Pat. No. 5,496,649 mentions that PVA is susceptible to moisture and to decrease its sensitivity one could cross-link using formaldehyde/acid. General cross-linking of PVA using dialdehydes is described in U.S. Pat. No. 4,902,464.

Glyoxal is also used as a crosslinking agent in adhesive formulations, for example, as a crosslinking agent for polyvinyl alcohol (PVOH) adhesive used in PVA and cellulose triacetate (TAC) film lamination. Glyoxal is a well known crosslinking agent within the PVA film industry to improve water resistance. However, there has not been a suggestion to use it as an adhesive to bond PVA polarizing film and TAC film. Further more, in the prior art like U.S. Pat. No. 7,704,572, glyoxal is always used as an additive, for example as a cross-linking agent used in a minor quantity in an adhesive where the adhesive represents the main component of the formulation. Other approaches suggest using metal crosslinking materials (U.S. Published Patent Application 2008/0278810) and other crosslinking agents such as glyoxal (U.S. Published Patent Application 2006/0155061) in PVOH adhesive to improve the film's water resistance. However, tests using these proposed adhesives failed to achieve the minimum requirements for adhesion. Therefore an adhesion problem arises that needs a solution.

In all of the prior approaches, glyoxal was used as a film additive or crosslinking agent and not as the main adhesive component. It is our desire to improve wet edging and wet adhesion performance in the presence of water. Therefore, it would be desirable to provide an adhesive to form a TAC/PVA/TAC polarizing film ensemble with improved wet adhesion. Furthermore, it would useful to employ such an adhesive in a polarizing film ensemble laminated to a lens which is then wet edged.

SUMMARY OF THE INVENTION

Accordingly, it is an object of an embodiment of the invention to provide an adhesive to form a polarizing film ensemble with improved wet adhesion.

It is a further object to provide such an adhesive with acceptable performance during edging operations in ophthalmic lens applications.

It is another object to employ such an adhesive in a process of forming a polarizing film ensemble, laminating the polarizing film ensemble to a lens surface and then surfacing the lens and custom edging to fit a frame for a wearer.

It is a further object to provide an aldehyde based adhesive system and more specifically a glyoxal based adhesive system for the various products, applications and processes.

It is another object to specify the compounds, and ranges to formulate the glyoxal based adhesive.

These and other related objects according to embodiments of the invention are achieved by an optical adhesive product and a process for manufacturing an optical adhesive product, laminated film ensembles, and laminated lenses.

According to an embodiment of the invention, there is provided an optical adhesive product for improved wet adhesion. The optical adhesive product includes a glyoxal water solution containing between about 5% and about 50% by weight glyoxal and adjusted to a pH below about 7. The optical adhesive product comprises an adhesive for laminated ophthalmic lens that demonstrates a wet peel force strength above about 6 Newtons.

The glyoxal water solution consists of glyoxal present in an amount between 30% and 50% by weight, less than 1% by weight of a pH adjusting compound, and the remainder water. The optical adhesive product is devoid of other compounds and demonstrates a wet peel force strength between about 8 to about 12 Newtons. The pH adjusting compound is hydrochloric acid (HCl) and the optical adhesive product is adjusted to a pH below about 6.

The optical adhesive product may contain a water based polymer that is present in an amount less than or equal to the amount of glyoxal. According to this formulation, the optical adhesive product contains glyoxal in an amount between about 3% and 40% by weight and the water based polymer present in an amount between 2% and 6% by weight. The water based polymer is preferably polyvinyl alcohol (PVOH) polymer. The product would also contain less than 1% by weight of a pH adjusting compound, and the remainder water. The optical adhesive product demonstrates a wet peel force strength between about 6 to about 18 Newtons.

In another formulation, the glyoxal is present in an amount of about 5%-10% by weight and the PVOH is present in an amount of about 3%-4% by weight. The optical adhesive product demonstrates a wet peel force strength between about 10 to about 16 Newtons. The water based polymer may be water based polymers containing OH groups in the structure, polyurethanes (PU) containing hydroxy groups, hydroxyethyl cellulose, hydroxypropyl cellulose, sodium carboxymethyl cellulose, or agarose.

In an alternate embodiment, there is provided a process for manufacturing an optical adhesive product for improved wet adhesion in laminated opthalmic lenses. According to the process, a glyoxal water solution is provided containing between about 3% and about 40% by weight glyoxal. An acid is added for adjusting the pH of the glyoxal water solution to below about 6 to form the optical adhesive product that demonstrates a wet peel force strength above about 6 Newtons.

The optical adhesive product may further include adding a water based polymer in an amount less than the glyoxal water solution. The optical adhesive product includes glyoxal present in an amount between about 3% and 40% by weight, and the water based polymer comprising polyvinyl alcohol (PVOH) polymer present in an amount between 2% and 4% by weight. The product would also contain less than 1% by weight of the acid and the remainder water. The optical adhesive product demonstrates a wet peel force strength between about 6 to about 18 Newtons.

In a further formulation, the glyoxal is present in an amount of about 5%-10% by weight and the PVOH is present in an amount of about 3%-4% by weight. The optical adhesive product demonstrates a wet peel force strength between about 10 to about 16 Newtons. The water based polymer may be water based polymers containing OH groups in the structure, polyurethanes (PU) containing hydroxy groups, hydroxyethyl cellulose, hydroxypropyl cellulose, sodium carboxymethyl cellulose, or agarose. The acid is hydrochloric acid (HCl).

The process, following the adding step, further includes providing optical films, introducing the optical adhesive product between the films, and laminating the optical films together. The optical films are two triacetate cellulose (TAC) films and a caustic treated polarized polyvinyl alcohol (PVA) film, wherein the PVA film is laminated in between the two TAC films. The films are roller laminated together in an environment between about 50 and 110 degrees Celsius for between about 0.1 and 3 hours to produce a polar TAC-PVA-TAC film ensemble having good polarization, color and cosmetics, wherein the optical adhesive product is present in uniformly thin layers, each less than about 5 microns.

The process additionally includes, following the laminating step, further laminating the polar TAC-PVA-TAC film ensemble to an optical substrate with an adhesive system. The adhesive system is one of a single layer adhesive system, a bi-layer adhesive system or a tri-layer adhesive system to form a laminated substrate. Subsequently, the process includes surfacing the substrate which comprises a semi-finished (SF) ophthalmic lens, coating the surfaced lens, and edging the coated lens. The optical adhesive product avoids film separation in the polar TAC-PAV-TAC film ensemble during edging.

The ophthalmic lens is made from polyepisulfide material having an index of refraction of 1.74 and the coating step includes coating the surfaced lens with a coating, for example, a protective coating, hard coating, anti-reflective coating, photochromic coating, tinted coating, anti-fog coating, or anti-smudge coating. The resulting laminated substrate includes an optical stack having the following layers in order, a polyepisulfide lens, an adhesive system, TAC film, the optical adhesive product, PVA film, the optical adhesive product, TAC film and a coating. In a further alternate embodiment, there is provided an optical article which comprises the following layers in order, an optical substrate, preferably an ophthalmic lens, an adhesive system, a TAC film, an optical adhesive product, a PVA film, an optical adhesive product, a TAC film and a coating. The optical substrate of the optical article is for instance a polyepisulfide ophthalmic lens.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1:
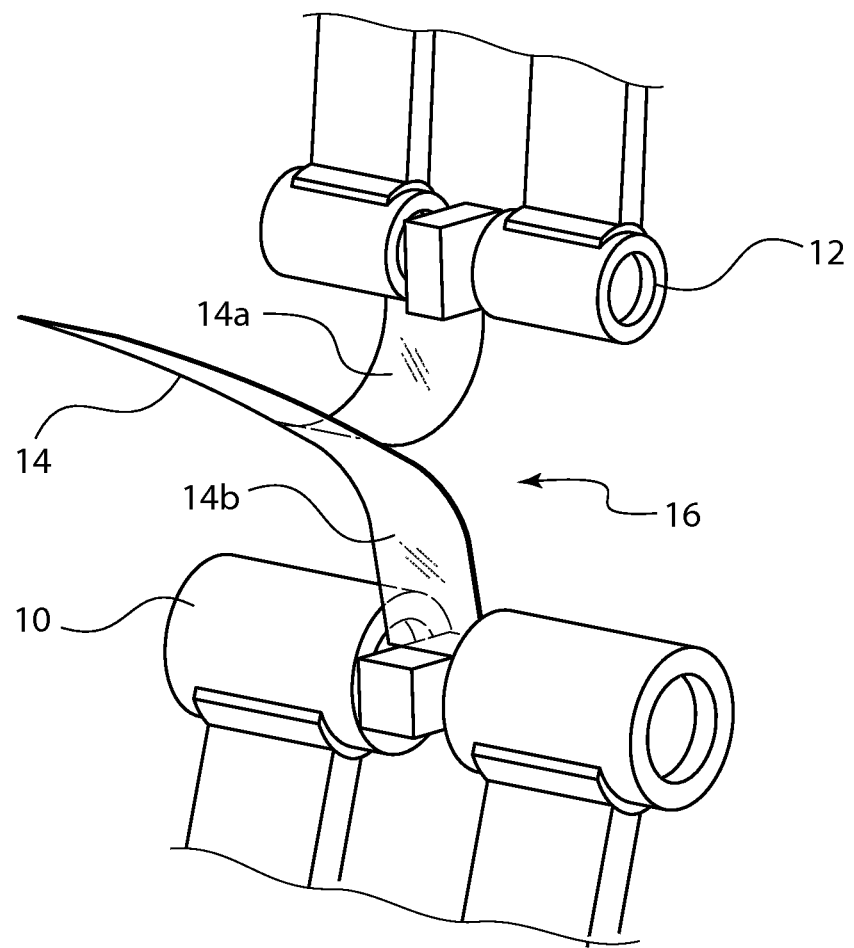
FIG. 1 is a schematic diagram of the equipment used for the peel force test.

In this application the following definitions apply to the various words mentioned.

Film refers to single layer of material, for example a TAC film or a PVA film.

Ensemble or film ensemble refers to two or more individual film layers that are adhered together.

Polar or polarizing film refers to a film ensemble which performs a polarizing function.

HCl means hydrochoric acid.

HMA means a hot melt adhesive.

PVA refers to a polarized polyvinyl alcohol film, that is, a single film layer.

PVOH refers to polyvinyl alcohol, that is, a solid dissolved in a liquid and is used as a component in an adhesive system.

SF means a semi-finished lens, that is a lens with one optical surface and another surface that needs to be ground to the wearer's Rx.

TAC refers to a triacetate cellulose or cellulose triacetate film, that is, a single film layer.

Rx means a prescription for an ophthalmic lens.

The suffix 'wt' means that the preceeding compound is present in a percentage based on weight. Unless otherwise indicated, all percentages are on a weight basis.

Wheel edging or wet wheel edging means mechanical shaping of the perimeter of an optical article using a grinding wheel typical in the optical industry without or with water.

Wet peel force, wet adhesion or peel force is a measure of the resistance of films to separate during Peel Force testing as measured by an Instron device, where the films are mechanically pulled apart from each other.

The polarized film ensemble is a TAC-PVA-TAC sandwich with a water based adhesive between each TAC film and the PVA film, such as a PVOH based adhesive. The PVOH adhesive is very sensitive to water, therefore, the TAC-PVA-TAC film has very poor wet adhesion properties. As a consequence, the film can be easily separated by water when placed in water for about 15 min at room temperature, as measured by a peel force test to separate the TAC from the PVA film. While a significant peel force can be measured in dry conditions, the presence of water causes the adhesion force to drop to zero.

Because of the water sensitivity of this adhesive and subsequently the water sensitivity of the polarizing film ensemble and its poor wet adhesion, the laminated lens made with such a polarizing film ensemble at its surface has a technical problem during wet wheel edging in Rx lens processing. It has been found that the TAC-PVA-TAC film ensemble is separated at the edge of the lens due to the combined detrimental effects of the wheel edging force and adhesion weakening brought about by the water applied during the edging process.

Therefore, there is a need to improve the TAC-PVA-TAC's internal wet adhesion force in order to overcome this wheel edging problem and obtain better edging performance for ophthalmic lens applications. Some prior art solutions have proposed to specify the types of edgers or edging cycle (limited to certain edges). For example, the use of knife edgers does not induce such film ensemble separation, since the nature of the applied mechanical force to remove material is different from wheel edging. Some other prior art patent applications have proposed the use of metal crosslinks (U.S. Published Patent Application 2008/0278810) and other crosslinking agents such as glyoxal (U.S. Published Patent Application 2006/0155061) in a PVOH based adhesive to improve the film's water resistance. However, tests using these proposed adhesives failed to achieve the minimum requirements for adhesion levels during wet edging.

Glyoxal is a well known crosslinking agent in the PVA film industry to improve water resistance. However, there has not been any suggestion to use it as an adhesive to bond PVA to TAC. Furthermore, in the prior U.S. Pat. No. 7,704,572, glyoxal is always used as an additive, i.e. used as a cross-linking agent in minor quantity in an adhesive formulation which represents always the main compound of the formulation.

The embodiments of the present invention present new and specific conditions/compositions including glyoxal with PVOH that can solve the above-noted challenging technical problems. More particularly, using Glyoxal itself alone and/or as major compound in the adhesive formulation represents a new and unexpected result.

In this patent application, a glyoxal adhesive system is disclosed to improve the wet adhesion between TAC-PVA films within the ensemble, and therefore to improve the wheel edging behavior in the presence of water. The chemical formula and molecular diagram for Glyoxal are as follows:

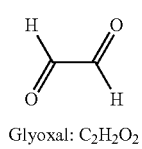

Glyoxal: $C_2H_2O_2$ (Formula 1)

The inventive adhesive system is based on glyoxal chemistry with glyoxal as a main component. Thanks to the reactive group in glyoxal, it was discovered that it can be used to react both to the PVA film's and the TAC film's surface OH group in an acid environment when heated. This reaction can build a very strong bonding between the PVA film and the TAC film. The most important result is that the wet adhesion between PVA and TAC film is greatly improved.

Another benefit of using gloxal as an adhesive for film is that it has a water based chemistry. Therefore it can be easily used in film lamination to replace the current water-based industrial PVOH adhesive. Also, it can be combined (but as major compound in the formulation) with other water based adhesive chemistry, such as PVOH to provide a super strong adhesive for TAC and PVA to be able to overcome the wheel edging problem of the current polar film ensemble.

Part of the solution to obtain a good adhesive system, is to prepare an acidic glyoxal formulation. The preferred organic acid tested to date is HCl.

EXAMPLES

The present invention will be described in greater detail below through the examples. However, the present invention is not limited only to these examples listed.

Example 1

In this example, glyoxal itself, is used as the adhesive for TAC-PVA film. A commercial glyoxal water solution (40% wt/Sigma-Aldrich #128465) was combined with a few drops of 1.0N HCl to obtain a solution with a pH<5 for use as an adhesive solution for TAC and PVA film. The TAC film (FT80SZ) was made by Fuji Corp and was subject to a caustic treatment before lamination. The caustic treatment condition was 10% NaOH for 4 min at 60° C. The PVA polar film was made by Onbitt from Kuraray 2400 grade clear PVA. Then, the TAC and PVA film were laminated by a roller lamination device with the formulated glyoxal adhesive then subjected to a temperature of 90° C. for 0.5 to 3 hrs. The obtained polar TAC-PVA-TAC film ensemble exhibited good polarization, color and cosmetics as compared to commercial polar TAC-PVA-TAC film ensemble made by Onbitt with PVOH based adhesive. However, it has much better adhesion than commercial polar film ensembles made with PVOH based adhesive, especially wet adhesion by peel force measurement as shown in the following Table 1, which lists wet peel force for two combinations of polar film and adhesive.

TABLE 1

| Polar PVA/TAC film Types | Adhesive | Wet peel force by Instron |
| --- | --- | --- |
| Example 1 | Glyoxal with HCl | >10 N |
| Commercial Polar film by Onbitt | PVOH based adhesive | ~1 N |

The values under the Wet Peel force by Instron in column 3, were obtained by the Instron peel force test method consisting of: 180° T-peel test with a film ensemble width of 25 mm at the peel speed of 0.75 mm/min in the presence of water. The water drops were continuously added between the TAC and PVA films during the T-peel test.

Examples 2-5

This is the same as in Example 1 except the glyoxal is formulated with a small amount of PVOH water based adhesive. The film lamination and cure cycle is the same as in Example 1. The obtained polar TAC-PVA-TAC film ensemble properties were as good as in Example 1. The wet adhesion results are shown in following Table 2.

TABLE 2

| Polar PVA/TAC film Types | Adhesive | Wet Peel Force measured by Instron |
| --- | --- | --- |
| Example 2 | 36 wt % glyoxal/1 wt % PVOH | 8-10 N |
| Example 3 | 10 wt % glyoxal/3.4 wt % PVOH | 16 N |
| Example 4 | 5 wt % glyoxal/3.4 wt % PVOH | 8-10 N |
| Commercial Polar Film from Onbitt | PVOH based adhesive | ~1 N |

Examples 5-6

The obtained Polar TAC/PVA/TAC film ensembles made in Ex. 3 and 4 were caustic washed and coated with latex-HMA as an adhesive layer to be laminated onto a 1.74 SF lens (0.75 base) that has been pre-washed and coated with latex. In this example the adhesive used is the tri-layer adhesive system as described in our published PCT patent application WO 2011/053329, the contents of which are incorporated herein by reference thereto.

The film lamination onto the 1.74 lens was done at 20 psi membrane pressure at 90° C. for 3 min and then post-annealed at 100° C. for 6 hr. This lamination process has been described in our published PCT patent application WO/2012/078152, the contents of which are incorporated herein by reference thereto.

After lamination, the lens was surfaced to a minus power of −12.0D then hard-coated. In lieu of, or in addition to the hard coating another coating could be used, for example a protective coating, anti-reflective coating, photochromic coating, tinted coating, anti-fog coating, and anti-smudge coating. Then the lens was wet wheel edged using a Triumph edger (Serial No 25038152) to a rectangular shape.

Edging Result: There was no adhesion failure or film separation seen on these lenses after edging.

Comparative Example 1

This is the same as Examples 5 and 6 except that the film ensemble was the commercial TAC-PVA-TAC made with PVOH adhesive by Onbitt Corp. The obtained lenses were surfaced, Hard Coated and edged in the same conditions.

Edging Result: There were many locations where adhesion failure and film separation was seen after edging. Such results would be rejected by quality control.

Comparative Example 2

This is the same as Examples 5 and 6 except that the film was prepared with an adhesive formulation containing a low amount of 0.8% Glyoxal in a 3.9% PVOH adhesive solution. The obtained lenses were surfaced, hard coated and edged in the same conditions.

Edging Result: While there were some improvements in film separations percentage after edging, some failures were present.

The wet adhesion peel force of this film was measured at <5 N.

Comparative Example 3

This is the same as Comparative Example 2 where glyoxal is replaced by 0.8% formaldehyde, a mono-functional aldehyde in a 3.9% PVOH adhesive solution. The obtained lenses were surfaced, hard coated and edged in the same conditions.

Edging Result: There was a significant amount of film separation seen after edging. Therefore, there was no improvement in film adhesion with mono-functional aldehyde of formaldehyde as an adhesive or adhesive promotion for TAC and PVA film.

The wet adhesion peel force test of the film made by formaldehyde is very poor at <1N which is similar to the commercial polar film by PVOH adhesive.

It has been noticed that good wet peel force is one necessary requirement for good wheel edging results, however, it does not guarantee good wheel edging results. One reason for poor edging results with good wet adhesion could be too thin an adhesive layer of Glyoxal and/or the adhesive lacking sufficient toughness to withstand the mechanical abrasion associated with wheel edging.

Therefore, a good ratio of Glyoxal and water based polymer such as PVOH is important to get best edging results by combining high wet adhesion and sufficient adhesive thickness to provide the required adhesion and adequate toughness of the laminated polar film to withstand the wheel edging force. Comparative Example 3 demonstrate that the used of bi-functional aldehyde compound is mandatory.

Other tests have demonstrated that the PVOH can be replaced by other water based polymers which have OH groups in the structure or polyurethane that contains hydroxy groups. Examples of other of water based polymers that can be employed in the products, applications and processes of the invention are polyhydroxyethyl cellulose, polyhydroxypropyl cellulose, poly(sodium carboxymethyl cellulose), and agarose. In agarose, the hydroxyl groups are located adjacent to each other, which is the ideal spacing for glyoxal crosslinking.

When PVOH wt % is lower than 5 wt % in water, as in Examples 2-4, a higher percentage of glyoxal is acceptable without encountering a very shorter pot life or gel issue. However, when the PVOH wt is more than 8 wt % in water, then there is a risk of reduced pot life and gel formation within about 5 min at room temperature at 10 wt % glyoxal as shown in Table 3.

TABLE 3

| Glyoxal % by Weight | PVOH % by Weight | Gel Formation |
| --- | --- | --- |
| 10% | 3.4% | No |
| 10% | 8% | Yes |

Accordingly, the PVOH amount should be monitored to remain less than 8%, preferably less than 6%, if glyoxal is present in the range of 10% by weight.

Generally, the thickness of the glyoxal adhesive will be below 5 micron, preferable below 2 micron. The above glyoxal compounds provide a wet peel force greater than 6N, preferably greater than 10N. For glyoxal alone the peel force is typically in the range of 8 to 12N, preferably about 10N. For the glyoxal and water based polymer adhesive systems, the peel force is typically in the range of 6 to 18N, preferably about 8 to 16N.

Glyoxal alone in the pH adjusted form as an adhesive provides improved wet adhesion. Glyoxal as major compound and a water based polymer, preferably PVOH as a minor compound provides even greater wet adhesion. The preferred embodiment comprises glyoxal 10% by weight, PVOH between 3 and 4% by weight, and less than 1% by weight of an acid, preferably HCl to adjust the pH to below 6, preferably around 5.

Peel force adhesion was measured by the T-peel (180 degrees) force method using Instron equipment. As can be seen in FIG. 1, The Instron equipment has a holder 10 at the bottom to hold one layer 14b of the film ensemble 14 stationary. At the top, an arm 12 pulls the other layer 14a of the film at increasing levels of force. When the arm moves, evidencing film ensemble separation into individual films 14a and 14b, the equipment records the current force level. In FIG. 1 the film is about 178 mm long and 25 mm wide. The arm is set to move at between 0.5 and 1.25 mm/min. The most important use of this test is to measure wet adhesion by adding water between the TAC and PVA films in direction 16 during peel testing to get both dry and wet adhesion force measurements for polar film.

Figure 2:
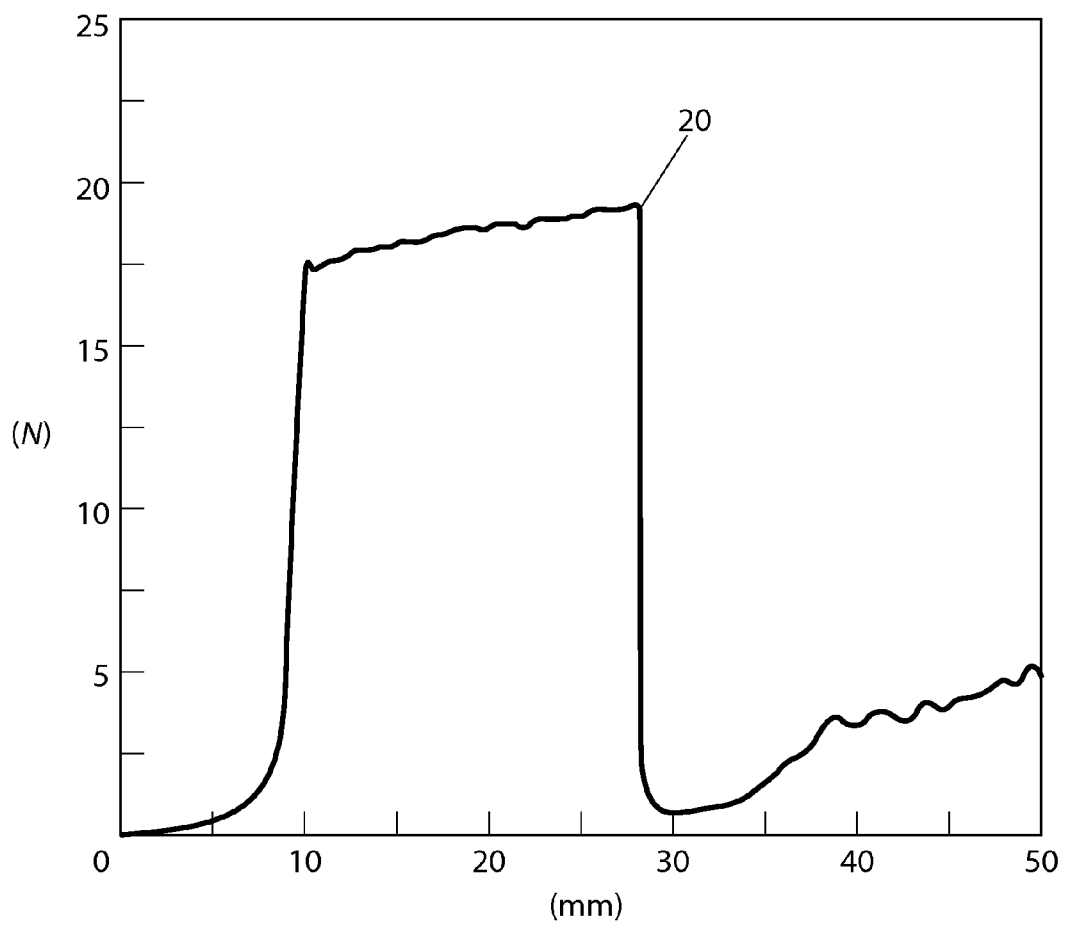
FIG. 2 is a graph showing the relationship between force and distance when water is added to the laminated film.

The commercial polar film has very poor wet adhesion. A graph of force (in Newtons—N) vs. distance (in mm) is shown in FIG. 2. In the range of about 10 to 28 mm the peel force was rising gradually. Note that as soon as the water was added at point 20, the peel force dropped to zero. In other words, the film layers basically separated upon contact with the water.

The adhesives, applications and processes described herein can be used with any films in ophthalmic lens applications. The inventive concepts are especially useful for film laminated lens applications where film separation is an issue during wheel edging. The invention provides a cost effective and easily implemented to improve film edging performance with any kind of wheel edgers.

Having described preferred embodiments for optical adhesive products and processes for manufacturing same with additional laminating steps, (which are intended to be illustrative and not limiting), it is noted that modifications and variations can be made by persons skilled in the art in light of the above teachings. For example, other equivalent compounds can be included in the optical adhesive product depending on the intended application. In addition, other lens laminating steps, or steps in different orders may be carried out to achieve similar results. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A process for manufacturing an optical adhesive product for improved wet adhesion in laminated opthalmic lenses comprising the steps of:
   providing a glyoxal water solution containing between about 3% and about 40% by weight glyoxal; and
   adding an acid for adjusting the pH of said glyoxal water solution to below about 6 and a water based polymer in an amount by weight less than said glyoxal water solution, to form the optical adhesive product that demonstrates a wet peel force strength between about 6 to about 18 Newtons,
   wherein the optical adhesive product includes:
   glyoxal present in an amount between about 3% and 40% by weight;
   said water based polymer present in an amount between 2% and 4% by weight and selected from the group consisting of polyvinyl alcohol (PVOH) polymer, polyurethanes (PU) containing hydroxy groups, hydroxyethyl cellulose, hydroxypropyl cellulose, sodium carboxymethyl cellulose, and agarose;
   less than 1% by weight of the acid; and
   the remainder water.

2. The process of claim 1, wherein said glyoxal is present in an amount of about 5%-10% by weight and said PVOH is present in an amount of about 3%-4% by weight, wherein the optical adhesive product demonstrates a wet peel force strength between about 10 to about 16 Newtons.

3. The process of claim 1, wherein the acid is hydrochloric acid (HCl).

4. A process of making an optical object comprising optical films and an optical adhesive product, said process comprising:
   manufacturing an optical adhesive product according to the process of claim 1;
   providing optical films;
   introducing the optical adhesive product between the films; and
   laminating the optical films together.

5. The process of claim 4, wherein said providing optical films step includes providing two triacetate cellulose (TAC) films and a caustic treated polarized polyvinyl alcohol (PVA) film, wherein the PVA film is laminated in between the two TAC films.

6. The process of claim 5, wherein said laminating step comprises roller laminating the films together in an environment between about 50 and 110 degrees Celsius for between about 0.1 and 3 hours to produce a polar TAC-PVA-TAC film ensemble having good polarization, color and cosmetics, wherein the optical adhesive product is present in uniformly thin layers, each less than about 5 microns.

7. The process of claim 6, wherein following said laminating step, the process includes the step of further laminating the polar TAC-PVA-TAC film ensemble to an optical substrate with an adhesive system selected from the group consisting of a single layer adhesive system, a bi-layer adhesive system and a tri-layer adhesive system to form a laminated substrate.

8. The process of claim 7, wherein following said further laminating step, the process includes the further steps of:
   surfacing the substrate which comprises a semi-finished (SF) ophthalmic lens;
   coating the surfaced lens; and
   edging the coated lens, wherein the optical adhesive product avoids film separation in the polar TAC-PAV-TAC film ensemble during edging.

9. The process of claim 8, wherein the ophthalmic lens is made from polyepisulfide material having an index of refraction of 1.74 and the coating step includes coating the surfaced lens with a coating selected from the group consisting of protective coating, hard coating, anti-reflective coating, photochromic coating, tinted coating, anti-fog coating, and anti-smudge coating.

10. The process of claim 7, wherein the resulting laminated substrate includes an optical stack having the following layers in order, a polyepisulfide lens, an adhesive system, TAC film, the optical adhesive product, PVA film, the optical adhesive product, TAC film and a coating.

* * * * *